US008045469B2

(12) United States Patent
Nagy et al.

(10) Patent No.: US 8,045,469 B2
(45) Date of Patent: Oct. 25, 2011

(54) SYSTEM AND METHOD FOR ADJUSTING TRANSMISSION DATA RATES TO A DEVICE IN A COMMUNICATION NETWORK

(75) Inventors: Tom Nagy, Waterloo (CA); David Mak-Fan, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 412 days.

(21) Appl. No.: 11/611,941

(22) Filed: Dec. 18, 2006

(65) Prior Publication Data

US 2008/0144501 A1    Jun. 19, 2008

(51) Int. Cl.
*G06F 11/00* (2006.01)
(52) U.S. Cl. ... 370/235; 370/229; 370/232; 375/240.01; 375/240.02; 375/240.07
(58) Field of Classification Search .................. 370/229, 370/230; 375/240.01, 240.02
See application file for complete search history.

(56) References Cited

U.S. PATENT DOCUMENTS

| 7,143,432 B1* | 11/2006 | Brooks et al. ................. 725/105 |
| 2002/0046379 A1* | 4/2002 | Miki et al. ..................... 714/749 |
| 2005/0003866 A1 | 1/2005 | Bechon et al. |
| 2006/0168295 A1* | 7/2006 | Batterberry et al. .......... 709/231 |
| 2006/0256130 A1* | 11/2006 | Gonzalez ....................... 345/619 |
| 2007/0009015 A1* | 1/2007 | Kunii et al. .................... 375/219 |

FOREIGN PATENT DOCUMENTS

EP         1 603 339        12/2005

\* cited by examiner

*Primary Examiner* — Huy Vu
*Assistant Examiner* — Omer Mian
(74) *Attorney, Agent, or Firm* — McCarthy Tétrault LLP

(57) ABSTRACT

The invention relates to a system and method for adjusting a characteristic of a data transmission in order to maintain a rate of transmission. For the method, it comprises: monitoring for initiation of the data transmission to the device; identifying characteristics of the device relating to the data transmission that affect the ability of the device to process the transmission; automatically adjusting the transmission rate according to a preset transmission rate progression established for the communication network; and adjusting characteristics of the data transmission to allow the characteristics of data transmission to conform to the characteristics of the device while maintaining the transmission rate for the device.

20 Claims, 6 Drawing Sheets

SYSTEM AND METHOD FOR ADJUSTING TRANSMISSION DATA RATES TO A DEVICE IN A COMMUNICATION NETWORK

The invention described herein relates to a system and method for adjusting transmission data rates to a device in a communication network. In particular, the data may be for a video feed; the device may be a wireless device; and the rate may be varied to retain a high transmission rate of frames without dropping frames.

BACKGROUND

Wireless handheld mobile communication devices perform a variety of functions to enable mobile users to stay organized and in contact with others in a communication network through e-mail, schedulers and address books. More sophisticated electronic devices have relatively large and bright colour displays and have the ability to receive relatively high-bandwidth data transmission streams, such as video streams, from sources that are linked to the network.

Video transmission links require a certain effective frame rate to be received at a device in order to generate a fluid moving image on the display of the device. Maintaining the effective frame rate to a wireless device can be difficult, given the variable nature of transmission rates to wireless devices.

There is a need for a system and method which addresses deficiencies in the prior art.

BRIEF DESCRIPTION OF THE DRAWINGS

Embodiments of the invention will now be described, by way of example only, with reference to the accompanying drawings, in which.

DETAILED DESCRIPTION OF AN EMBODIMENT

Figure 1:
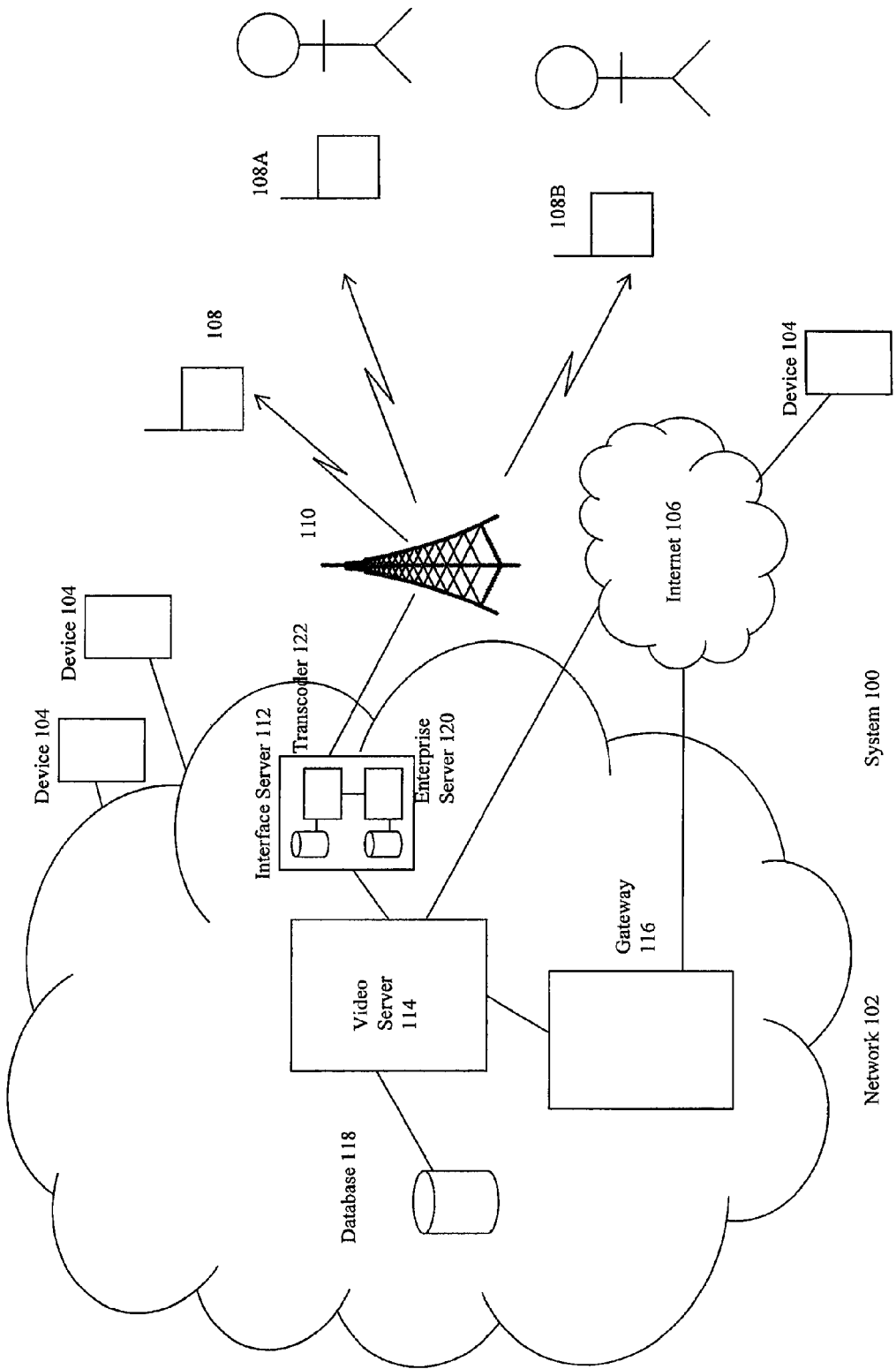
FIG. 1 is a schematic diagram of a communication network providing data transmissions from the network to wireless devices through a transcoder as provided in an embodiment.

The description which follows and the embodiments described therein are provided by way of illustration of an example or examples of particular embodiments of the principles of the present disclosure. These examples are provided for the purposes of explanation and not limitation of those principles and of the invention. In the description which follows, like parts are marked throughout the specification and the drawings with the same respective reference numerals.

In a first aspect, a method for adjusting a download transmission rate for a data transmission destined for a portable device through a communication network is provided. The method comprises: monitoring for initiation of the data transmission to the device; identifying characteristics of the device relating to the data transmission that affect the ability of the device to process the transmission; automatically adjusting the transmission rate according to a preset transmission rate progression established for the communication network; and adjusting characteristics of the data transmission to allow the characteristics of data transmission to conform to the characteristics of the device while maintaining the transmission rate for the device.

In the method, the data transmission may be a video stream; the device may be a wireless device; the characteristics of the data transmission may relate to resolution and colour depth of frames of the video stream; the characteristics of the device may relate to at least characteristics of a display of the device; and the transmission rate may be adjusted according to a UMTS protocol.

The method may be executed at a transcoder providing the video stream to the wireless device.

In the method, the characteristics of the device may further relate to video processing software operating on the device.

In the method, the transmission rate may further be adjusted depending on any acknowledgement messages provided from the device to the transcoder. In particular, the transmission rate may be adjusted depending on contents of a receipt history of acknowledgement messages received by the transcoder the device. Further, for the method, the transmission rate may be increased only if the receipt history indicates that the acknowledgement messages are being received.

In the method, adjusting characteristics of the data transmission may utilize data relating to resolution and colour depth capabilities of the display.

In the method, the data transmission may be configured to avoid dropping frame from the video stream.

In the method, adjusting characteristics of the data transmission the device may provide to the transcoder data relating to resolution and colour depth capabilities of its display and data relating to its video processing software.

In a second aspect, a module for adjusting a download transmission rate for a data transmission destined for a portable device through a communication network is provided. The module comprises: a monitoring process to monitor for initiation of the data transmission to the device; an analysis process to identify characteristics of the device relating to the data transmission that affect the ability of the device to process the transmission; and a transmission adjustment process to automatically adjust the transmission rate according to a preset transmission rate progression established for the communication network and to allow the characteristics of data transmission to conform to the characteristics of the device while maintaining the transmission rate for the device.

In the module, the data transmission may be a video stream; the device may be a wireless device; the characteristics of the data transmission may relate to resolution and colour depth of frames of the video stream; the characteristics of the device may relate to characteristics of a display of the device; and the transmission rate may be adjusted according to a UMTS protocol.

The module may be a transcoder providing the video stream to the wireless device.

In the module, the characteristics of the device may further relate to video processing software operating on the device.

In the module, the transmission rate may be further adjusted depending on any acknowledgement messages provided from the device to the transcoder.

In the module, the transmission adjustment module may utilize data relating to resolution and colour depth capabilities of the display to adjust characteristics of the data transmission.

In the module, the transmission adjustment module may be configured to avoid dropping frame from the video stream in the data transmission.

In the module, the adjustment module may use data relating to resolution and colour depth capabilities of the display to adjust the characteristics of the data transmission.

In other aspects, various combinations of sets and subsets of the above aspects are provided.

Generally, an embodiment provides a system and method for providing and adjusting data transmissions to a device in a communication network. In one embodiment the data transmission relates to a video feed and the device is a wireless device receiving the feed.

Exemplary details of embodiments are provided herein. First, a description is provided on general concepts and features of an embodiment and its related transmission adjustment mechanisms. Then, further detail is provided on an exemplary transcoder related to an embodiment.

First, details on an exemplary network for an embodiment are provided. FIG. 1 shows communication system 100 where network 102 provides a suite of applications, services and data to its connected devices 104 through its associated servers. Devices 104 connect to network 102 through wired connections or through an external connection through Internet 106. Network 102 can be implemented in any known architecture, providing wired or wireless connections to its elements. Security systems within network 102 can be provided by known techniques and systems. Gateway 116 provides and monitors selected communications between elements in network 102 and external devices connected through Internet 106.

Wireless devices 108 communicate with each other through wireless network 110. Network 110 includes an antenna, a base station and supporting radio transmission equipment known to those skilled in the art. In one embodiment, the equipment and supporting servers for network 110 deploy an Universal Mobile Telecommunications System (UMTS) network. UMTS is a third-generation (3G) mobile phone technology using W-CDMA as the underlying transmission standard. UMTS systems are deployed in Europe as a system that adheres to the ITU IMT-2000 requirements for European 3G cellular radio systems.

Interface server 112 in network 102 provides hardware and software systems to allow devices 104 in network 102 to communicate with devices 108 in wireless network 110. For communications directed to wireless devices 108, wireless services enterprise server 120 provides an interface with video server 114 for transmissions destined to devices 108. Transcoder 122 provides a collection and processing point for the video streams and other data transmission destined for devices 108 through network 110.

In network 102, video server 114 is a repository for video files. Database 118 provides a data storage system for one or more elements in network 102, including video server 114. Video server 114 is shown as passing its external (non-wired) emails through gateway 116. In other network configurations, video server 114 may bypass gateway 116 for its external connections to Internet 106.

For server 114, a video file may be stored as a series of digitalized frames, where each frame captures an instantaneous still-image of the video. To produce a video image, the series of frames are sequentially shown on a display. The visual quality of the image is governed by at least three factors:
1. the frame rate, which represents how frequently the video image is updated with the next frame in the sequence;
2. the resolution of the frame, which is normally expressed in pixels; and
3. the colour (or grey scale) depth of each frame.

In order to provide efficient downstream transmissions of the frames in a video signal from server 114, each frame is typically compressed before it is transmitted from server 114 to its destination. As such, a compressed frame is smaller in size than the original frame, making the compressed frame easier to transmit. When the destination receives each frame, each frame is decompressed and then generated on the display at the destination. Compression takes advantage of spatial and temporal redundancy of data between frames. Compression algorithms are either lossy or lossless. For lossless compressions, when the transmitted frame is decompressed, the result is identical to the original frame. Lossless compression for a video signal is not generally used as it would require extensive hardware at the destination to process an uncompressed video signal. Lossy video compression techniques have been developed by several industry standard bodies. Such compression standards include JPEG and MPEG (Moving Picture Experts Group) standards. Each compression standard was designed to apply to a specific application and bit-rate. The MPEG standards include:

MPEG-1 which supports transmission rate of up to 1.5 Mbit/sec. This compression is frequently used for moving pictures and audio. MPEG-1 is a popular standard for video files sent through the Internet, transmitted as .mpg files.

MPEG-2 which supports transmission rates of between 1.5 and 15 Mbit/s. This compression is frequently used for digital television set top boxes and DVD formats.

MPEG-4 which is commonly used for multimedia and Internet web-page compression.

The video server 114 would typically store its videos already in compressed format; as raw videos may be either too large to be either stored or sent over most networks. In most installations, sever 114 consists of a store (possibly a database) of videos, and a mechanism to stream them out over the network. The format used for compression of videos on the Internet would typically be Windows Media Video (WMV), Real Video, or MPEG-4 or any variants thereon.

When a video stream is provided over wireless network 110, two bandwidth-related issues in transmitting the video stream to the wireless devices arise:
1) Algorithms for controlling data transmission rates in UMTS and other networks are not necessarily tuned to transmitting video streams. Typically, these networks start a downlink transmission at a very low rate, then gradually increase the transmission rates up to a maximum speed. For example, for the first minute of a video transmission, device 108 may be receiving video frames at a very slow downlink rate, which would not provide a smooth video image.
2) Downstream transmission rates also vary on the quality of the connection between the device 108 and the transmission tower for a particular cell in network 110. As device 108 moves further away from the tower, its downlink rate drops. If this is the result of multipath or other fading, the poor coverage will be transient, so the throughput will rise back up in a short time.

Both of the two issues noted above can result in dropping individual frames in the video stream as it is being transmitted. This strategy preserves the image quality of individual frames, but degrades the frame rate. The video output, however, is not as realistic as there are larger time gaps between successive frames, causing larger changes in motion being presented between successive frames.

The embodiment provides a system and method that transmits a video stream to wireless devices and adjusts the transmissions by adjusting transmission rates and compression characteristics for the stream, and attempts to avoid dropping frames. It will be appreciated that other embodiments can be provided for other types of data transmission to other types of devices in other types of communication networks. Further detail is now provided on elements, systems and algorithms relating to an embodiment.

For an embodiment, as downstream transmission rates and compression levels is being controlled as a video stream is being sent from server 114 to device 108, transcoder 122 may be used to implement some or all of the adjustments to the video stream. Transcoder 122 is a transfer agent that routes video signals from one or more source (e.g. video server 114 or other devices in network 100) to one or more devices in network 110, thereby allowing a singly-sourced video stream to be distributed to a wide set of heterogeneous mobile devices. Transcoder 122 provides an intermediary transition point for a video stream allowing it to be tailored to individual devices 108.

In short, transcoder 122 is a data conversion point that provides digital-to-digital conversion from one coder/decoder (codec) format to another. The originating format may or may not be lossy. Transcoder 122 may decompress the received video stream into an intermediate, raw format, such as PCM or YUV. From the intermediate format, the video stream may then be subsequently encoded into a different format to an output video stream that is directed to a wireless device 108. The output video stream may use a lower bitrate format for the image and/or may change other compression characteristics of the image. Such changes may be made without deviating from the format of the original video stream. Exemplary transmission rates used by a codec may follow ITU-T standards such as H.261 and H.263.

Figure 2:
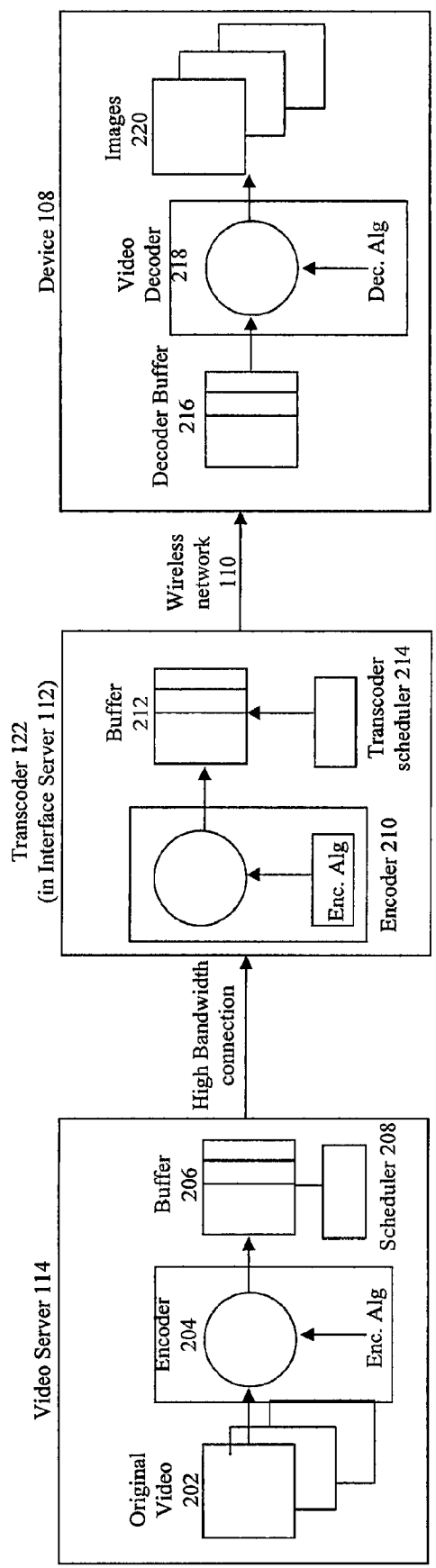
FIG. 2 is a schematic diagram of a data transmission session for the transcoder of FIG. 1.

FIG. 2 shows an exemplary process 200 of transmission of a video stream from video server 114 through transcoder 122 in enterprise server 120 to devices 108. Video server 114 comprises video sources 202, video encoder 204 and video encoder buffer 206. Video sources 202 may be live video sources, television clips, animation segments, movie clips etc. Sources 202 are stored in a storage location accessible by server 114, such as database 116. Each video source may be encoded in one or more video formats.

When a request for a video stream is completed between wireless device 108 and server 114, the following processes are executed. First, the identified video stream is identified and is retrieved from sources 202. The raw video stream is provided to encoder 204, which then takes the stream on a frame-by-frame basis and encodes the stream, again on a frame-by-frame basis, into an appropriate format suitable for transmission in network 102. After each frame is encoded, it is provided to encoder buffer 206, which buffers each frame in a queue, such as a FIFO queue. Scheduler 208 controls the release of each frame to network 102 according to a scheduling scheme. Scheduler 208 may release one or more frames at different rates, depending upon input parameters relating to the topologies of network 102, video server 114 and any additional relevant transmission gateway.

Each released frame is encoded into one or more data packets suitable for transmission through network 102. Each packet can be tracked as it traverses through network 102. Each released frame is routed through network 104 to transcoder 122 over a high-bandwidth link.

As noted earlier, transcoder 122 is used to identify an appropriate frame compression (if any) that can be provided to the video stream, on a frame-by-frame basis, for the target device 108. The released frame is received at encoder 210 and is further compressed by an algorithm that provides a compression or bitrate conversion based on an analysis of the transmission characteristics of the video image, transmission characteristics of network 110 and video processing and display characteristics of target device 108. Once encoded for transmission to network 110, the compressed frame is provided to buffer 212, which places it into a queue, such as a FIFO queue. Each compressed frame is released from buffer 212 according to scheduler 214.

Before or after each compressed frame is released from buffer 212, each compressed frame is converted into one or more wireless data packets and the compressed frame is transmitted over wireless network 110 following its transmission protocols.

Eventually, as each packet of a compressed frame is received by device 108, the collection of packets are used to reassemble the compressed frame, which is then provided to decoder buffer 214, which buffers each frame in a queue, such as a FIFO queue. The compressed frames are extracted from buffer 214 according to an extraction algorithm 216 and are provided to decoder 218. Decoder then analyzes the compressed frame generates an image relating to it on the display of device 108. Meanwhile, the next compressed frame in the video stream is being extracted from buffer 214 and is then decoded by decoder 218 and is finally generated on the display of device 108. That next frame is displayed on the device at a frame rate suitable for the processing and display capabilities of device 108.

Consider the following components in process 200, where device 108A in network 110 is a camera phone and has captured a digital video. The digital video file would be represented by a series of high-resolution JPEG images, usually at least a resolution of 640×480 pixels with a colour depth of 24 bits. Camera phone 108A is sending the video file to camera phone 108B. For the sake of this example, the video file would be sent from phone 108A through network 110 to transcoder 122, then back through network 110 to phone 110B. During the processing and transmission of the video file, it may be transcoded to a lower resolution image with less amount of color, having a level of detail that is more suited to the screen size and color limitation of phone 108B. For example, if phone 108B has a screen size of 120×160 pixels and can process a maximum colour depth of 16 bits, then at some point during the transmission of the video file, the individual images in the file may be encoded to contain the level of detail and depth of colour that is associated with the display of phone 108B. It will be appreciated that this image size and color depth reduction may assist in improving the user experience on phone 108B because the video information is provided faster. Further, for some devices, having the reduced images may be the only way for content to be sent between phones 108A and 108B.

In one embodiment, for network 110, devices 108 are registered with server 102. Through an initial registration scheme or a configuration message sent from the device to network 110, the following information about a particular device 108 is provided: central processing unit (CPU)/microprocessor type, screen type, versions of applications, operating system version, and other information. This data may be stored in a database associated with the interface server. A subset of the information is also provided to transcoder 122. Table A1 provides an exemplary data set of devices 108 tracked by transcoder 122, whether by itself or through one or more of interface server 112, enterprise server 120, video server 114 and itself.

TABLE A1

| Device ID number | Device Type | Display Type | Processor | Applications |
|---|---|---|---|---|
| 1 | Manufacturer (Mfg) #1, Model A, Version 1 | 2 inch 120 × 160 pixels 4:3 aspect ratio 4 bit colour | Proc. Mfg #1, Model A, Version 1 | Video processing software, Version 1 |
| 2 | Mfg #1, Model A, Version 2 | 2.5 inch 160 × 200 pixels 16:9 aspect ratio 8 bit colour | Processor Mfg #1, Model B, Version 1 | Video processing software, Version 2 |
| ... | ... | | | |
| n | Mfg #y, Model 14, Version 2 | 2.5 inch 200 × 240 pixels 16:9 aspect ratio 24 bit colour | Processor Mfg #z, Model B, Version 4 | Video processing software, Version 2.5 |

For each display and application, Tables A2 and A3 provide a list of exemplary options of acceptable resolutions and colour depths, for a particular version of the display and video display software.

TABLE A2

| Device Identification number | Device Type/ Display | Ranking of acceptable Display Resolutions | Ranking of acceptable Colour Depths |
|---|---|---|---|
| 1 | Mfg #1, Model A, Version 1 2 inch 120 × 160 pixels 4:3 aspect ratio 4 bit colour | 120 × 160 100 × 140 80 × 120 | 4 2 |
| 2 | Mfg #1, Model A, Version 2 | 120 × 160 100 × 140 80 × 120 | 8 4 2 |
| ... | ... | | |
| n | Mfg #y, Model 14, Version 2 | 200 × 240 120 × 160 100 × 140 80 × 120 | 24 16 8 |

TABLE A3

| Device Identification number | Application Software | Ranking of acceptable Display Resolutions | Ranking of acceptable Colour Depths |
|---|---|---|---|
| 1 | Video processing software, Version 1 | 120 × 160 100 × 140 80 × 120 | 4 2 |
| 2 | Video processing software, Version 1 | 120 × 160 100 × 140 80 × 120 | 8 4 2 |
| ... | ... | | |
| n | Video processing software, Version 2.5 | 200 × 240 120 × 160 100 × 140 80 × 120 40 × 60 | 24 16 8 4 |

It is noted that values of Tables A2 and A3 may or may not have similar values for the degradation levels associated with the versions of the displays and the software.

Table B provides an exemplary transmission rate of frames for a network for video transmissions to device 108.

TABLE B

| Time | Throughput rate |
|---|---|
| Start | 3 kbit/s |
| 10 seconds | 5 kbit/s |
| 20 seconds | 30 kbit/s |
| 30 seconds | 60 kbit/s |

It will be appreciated that any type of transmission rate curve may be stored by an embodiment, whether in a table form, a formula or set variables. Any particular curve may be generally increasing, monotonic, exponential, step-wise or other functions, including combinations of any curves for different transmission periods.

For a device 108 receiving a video stream from transcoder 122, transcoder 122 can adjust the video stream to the device as follows. First, transcoder 122 can begin tracking a video stream for device 108 when it is first received at transcoder 122 from server 114. An initial administrative message associated with the stream provided by server 114 can be sent that indicates the start time of the video transmission, the duration, and the target device 108. Transcoder 122 can then define a bandwidth for the stream according to Table B. Specific resolution and colour depth values for particular frames at particular instances in time during the transmission can be made by correlating the throughput rate at a given time in the transmission to such values. Table A2 an exemplary data set of devices 108 tracked by transcoder 122, whether by itself or through one or more of interface server 112, enterprise server 120, video server 114 and itself.

By lowering the output resolution of the image and having device 108 scale up the lower-resolution image, more bits can be allocated to encoding each frame; this results in better image quality than if the resolution were held fixed. Transcoder 122 may use a streaming format that is known in the art that allows for varying resolutions Colour-depth is another variable that can be degraded when the throughput is low.

By knowing the capabilities of device 108, transcoder 122 may further optimize the transmission stream. The type of CPU on device 108, the type of display, the version of the operating system or the video processing software, etc., may individually or collectively be assessed in determining a throughput rate and a display characteristics for the video stream, thereby improving image quality and preferably maintaining the frame rate for the stream. For example, referring to Tables A1-A3 and B, for Device ID #2, Table C shows exemplary resolution and colour depth values may be used during the noted transmission times:

TABLE C

| Video frame values for a transmission to Device #1 | | | |
|---|---|---|---|
| Time | Throughput rate | Display Resolution | Colour Depth |
| Start | 1 Mbps | 80 × 120 100 × 140 | 2 4 |
| 10 seconds | 3 Mbps | 80 × 120 100 × 140 | 2 |
| 20 seconds | 5 Mbps | 100 × 140 120 × 160 | 2 4 |
| 30 seconds | 20 Mbps | 120 × 160 | 4 |

It is noted that the Display Resolution and Colour Depth fields can each provide a set of values that can be selected for the current display. The options, in this embodiment, are shown in order of least bandwidth intensive from top to bottom.

It will be appreciated that for some embodiments, once Table B is analysed, the selected resolution and colour depth can be identified by a multitude of variations among the available parameters for both variables. For example, for a given transmission time, an emphasis can be placed on reducing the colour depth before reducing the resolution (or vice versa) or a choice can be made to reduce each by one or more levels.

Each device 108 can provide more or less information to server 112. Such information may be provided through typical "heartbeat" messages that are sent on a periodic basis from devices 108 to server 112. At certain instances or intervals, device 108 may send a message to transcoder 122 providing details on its video processing capabilities. Such message may include characteristics of its display (including its resolution and colour depth).

The embodiment allows for adjustment of the display parameter and the transmission rates for device 108 without expecting or waiting for an acknowledgement (ACK) or NACK to be received by transcoder 122 from device 108. This reduces the amount of uplink data sent by device 108 to transcoder 122. Nevertheless, in other embodiment, receipt of a heartbeat or ACK/NACK message(s) from device 108 can be used as a factor to determine whether or if the transmission rate is increased or if resolution or colour depth characteristics of a frame are changed. For example, the parameters can be changed on a basis as provided per an assumed normal transmission mode, such as shown in Table C, unless two heartbeat consecutive expected signals are not received from device 108. In such a case, the transmission rate or the frame characteristics may remain the same. A receipt history of such messages may be kept to assist in making this determination. The transmission rate may be increased depending on an analysis of the history. For example, the transmission rate may be increased only if the transcoder determines from the history that there is some (recent) acknowledgement messaging activity received from the device.

Figure 3:
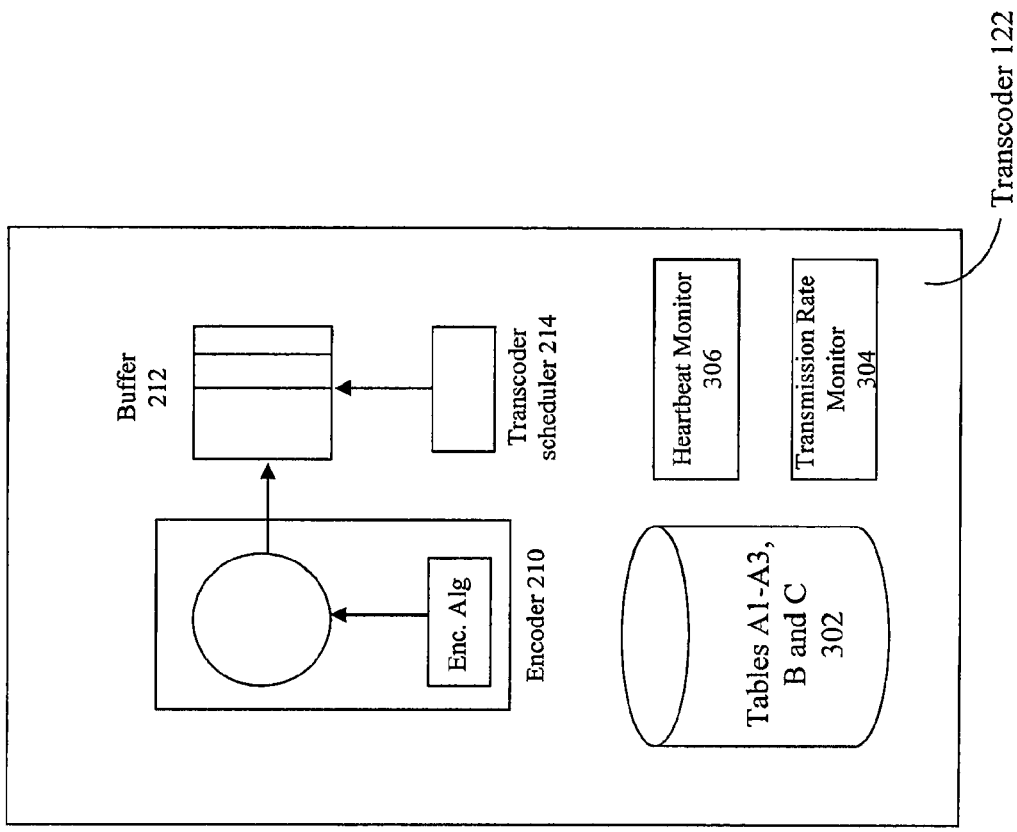
FIG. 3 is a block diagram of the transcoder of FIG. 1.
Figure 4:
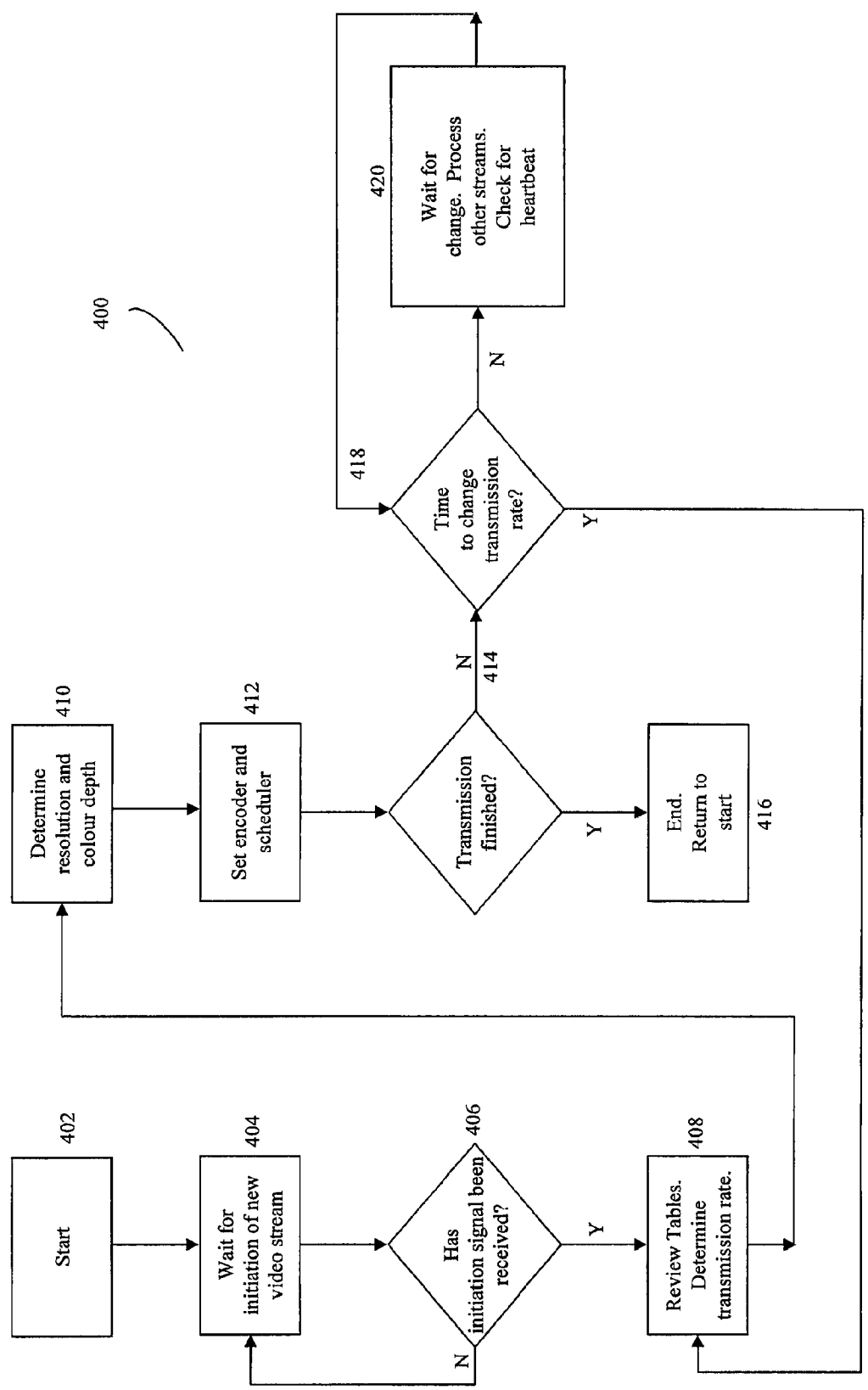
FIG. 4 is a flowchart of exemplary steps executed by the transcoder of FIG. 1 in providing and adjusting a data transmission stream in accordance with an embodiment.

Referring to FIGS. 3 and 4, further detail is provided on transcoder 122.

Referring to FIG. 3, further detail is shown generally at 300 for transcoder 122. In addition to encoder 210, buffer 212 and transcoder scheduler 214 described earlier, database 302 is provided to store and update data relating to transmission parameters for video streams, such as data relating to Tables A1-A3, B and C. Transmission rate monitor 304 provides a process that monitors the current status of a video transmission, including the current elapsed time of the transmission and any feedback signals and messages provided from video server 114. Heartbeat monitor 306 is provided to monitor for any ACK/NACK or other signals provided from device 108 and to determine how and when to adjust the transmission parameters in accordance with such signals. It will be appreciated that the transmission parameters of the video stream are automatically adjusted according to parameters defined in Tables A1-A3, B and C. Adjustments made due to signals from heartbeat monitor 306 may or may not be used to adjust parameters of the video stream. Additional elements for transcoder 122 are not shown in FIG. 3, but are understood by those skilled in the art as being part of transcoder 122, including a microprocessor, volatile and non-volatile memory, input and output ports and firmware and software operating thereon to provide the queues, schedulers, encoders and other aspects of transcoder 122.

Referring to FIG. 4, flow chart 400 shows a process operating on transcoder 122 used to identify when a video stream is received from server 114 for transmission to device 108 and when and how to set and adjust transmission parameters for the stream to device 108.

In operation, transmission rate monitor 304 (FIG. 3) can be used to provide monitoring functions. Encoder 210 and scheduler 214 can be used to control and generate outputs from process 400.

Process 400 begins at start 402, which simply identifies the starting point for the process. From start 402, process 400 immediately proceeds to step 404, where it waits for an initiation of a new video stream. Other similar processes 400 may be operating at the same time in transcoder 122.

At step 406, a test loop is provided to determine if a video stream has been initiated. If no stream is detected, then the loop flows back to step 404. If a new video stream has been detected (e.g., from the receipt of a new message from server 114), then process 400 proceeds to steps 408, 410 and 412, where parameters relating to the stream are identified, including the destination device 108, the initial transmission rate and the initial transmission quality parameters. These values can be extracted or developed after analyzing Tables A1-A3 and B to generate parameters found in Table C. The transmission quality values are provided to encoder 210 and the transmission rate parameters are provided to scheduler 214.

Next, at test 414, a check is made to determine if the stream has finished its transmission. If it has, then the process ends at step 416 and returns to start step 410. If the transmission has not completed then a test is made at test 418 to determine if it is time to change transmission parameters for the stream. This can be due to passage of the next time for which the transmission rate is increased, per Table B. If there is a change, then process 400 returns to step 408 to determine the new operating and transmission parameters per the current time stage of the transmission. If there is no change (for example, because the next time for a transmission change has not yet elapsed), then process 400 moves to step 420, where it waits for a change. During this stage, the heartbeat signal from device 108 may be monitored. Other streams may also be reviewed. Other administrative functions for process 400 may be executed here. Once these functions are complete, process 400 returns to step 418 to monitor again for a next transmission increase.

It will be appreciated that other embodiments may have the elements of process 200 in different orders or may have more or less steps and tests therein. Process 200 may be atomized and may be executed by one or more processes operating on transcoder 122.

It will further be appreciated that other embodiments may implement aspects in different configurations and arrangements than those described to this point. For example, another video server for an embodiment may have a database of video clips bundled in with it. Further, this video server may be located anywhere in connection to a network from where interface server 112 is located. It will be appreciated that use of interface server 112 and transcoder 122 allows a video file to be located almost anywhere on a network, from where the video can be streamed to a desktop PC and may be transcoded and streamed to a handheld device.

Further detail is now provided on device 108 (FIG. 1), which receives the video stream from transcoder 122.

Figure 5:
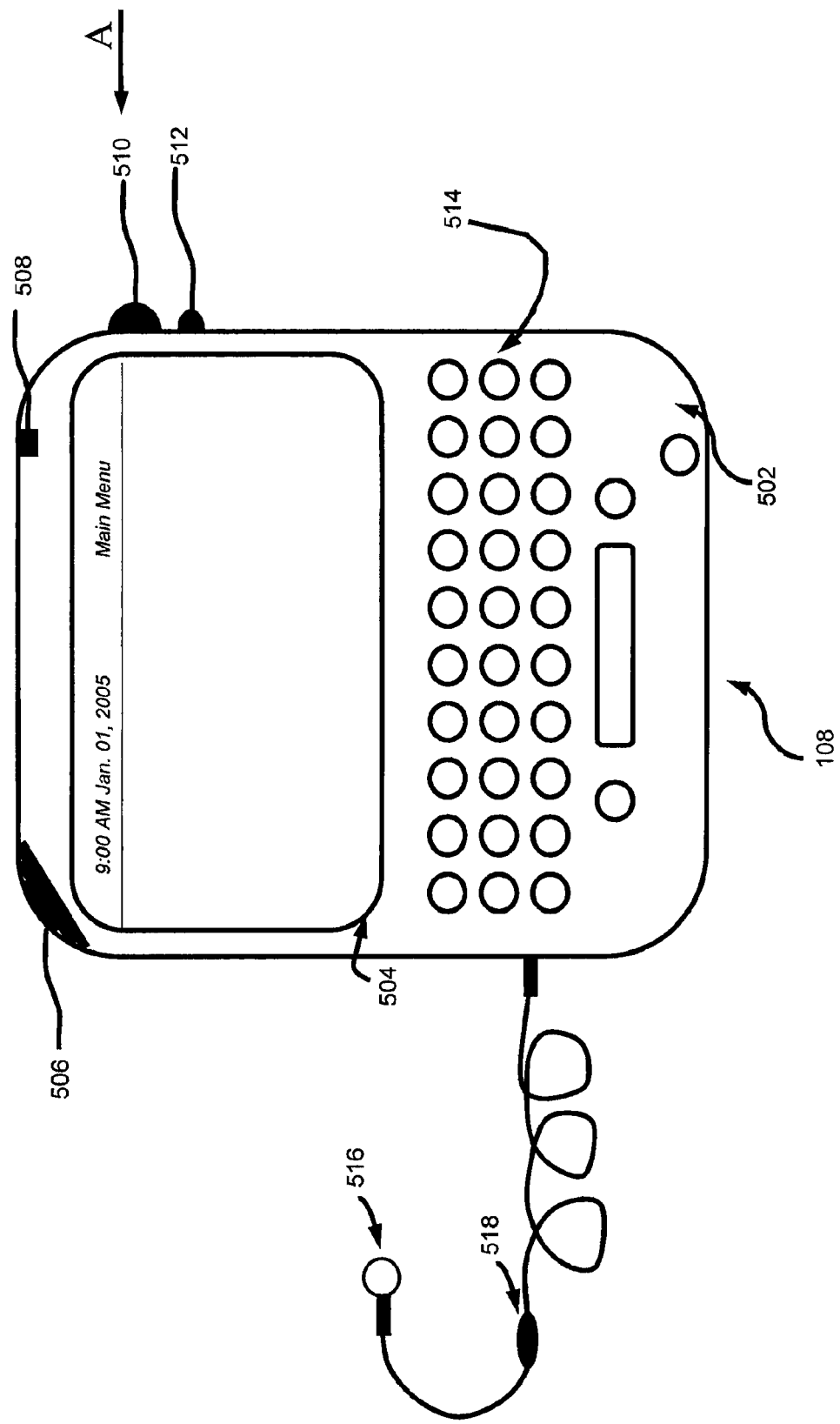
FIG. 5 is a schematic representation of a wireless electronic device receiving the data transmission from the transcoder in FIG. 1 in accordance with an embodiment.

FIG. 5 provides general features of an electronic device for receiving electronic communications in accordance with an embodiment of the invention, which is indicated generally at 108. In the present embodiment, electronic device 108 is based on a computing platform having functionality of an enhanced personal digital assistant with cellphone and e-mail features. It is, however, to be understood that electronic device 108 can be based on construction design and functionality of other electronic devices, such as smart telephones, desktop computers, pagers or laptops having telephony equipment. In a present embodiment, electronic device 108 includes a housing 502, an LCD 504, speaker 506, an LED indicator 508, a trackball 510, an ESC ("escape") key 512, keypad 514, a telephone headset comprised of an ear bud 516 and a microphone 518. Trackball 510 and ESC key 512 can be inwardly depressed along the path of arrow "A" as a means to provide additional input to device 108.

It will be understood that housing 502 can be made from any suitable material as will occur to those of skill in the art and may be suitably formed to house and hold all components of device 108.

Device 108 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Bluetooth and the many forms of 802.11 wireless broadband, like 802.11a, 802.11b, 802.11 g, etc. that support voice. Other embodiments include Voice over IP (VoIP) type streaming data communications that can simulate circuit-switched phone calls. Ear bud 516 can be used to listen to phone calls and other sound messages and microphone 518 can be used to speak into and input sound messages to device 108.

Figure 6:
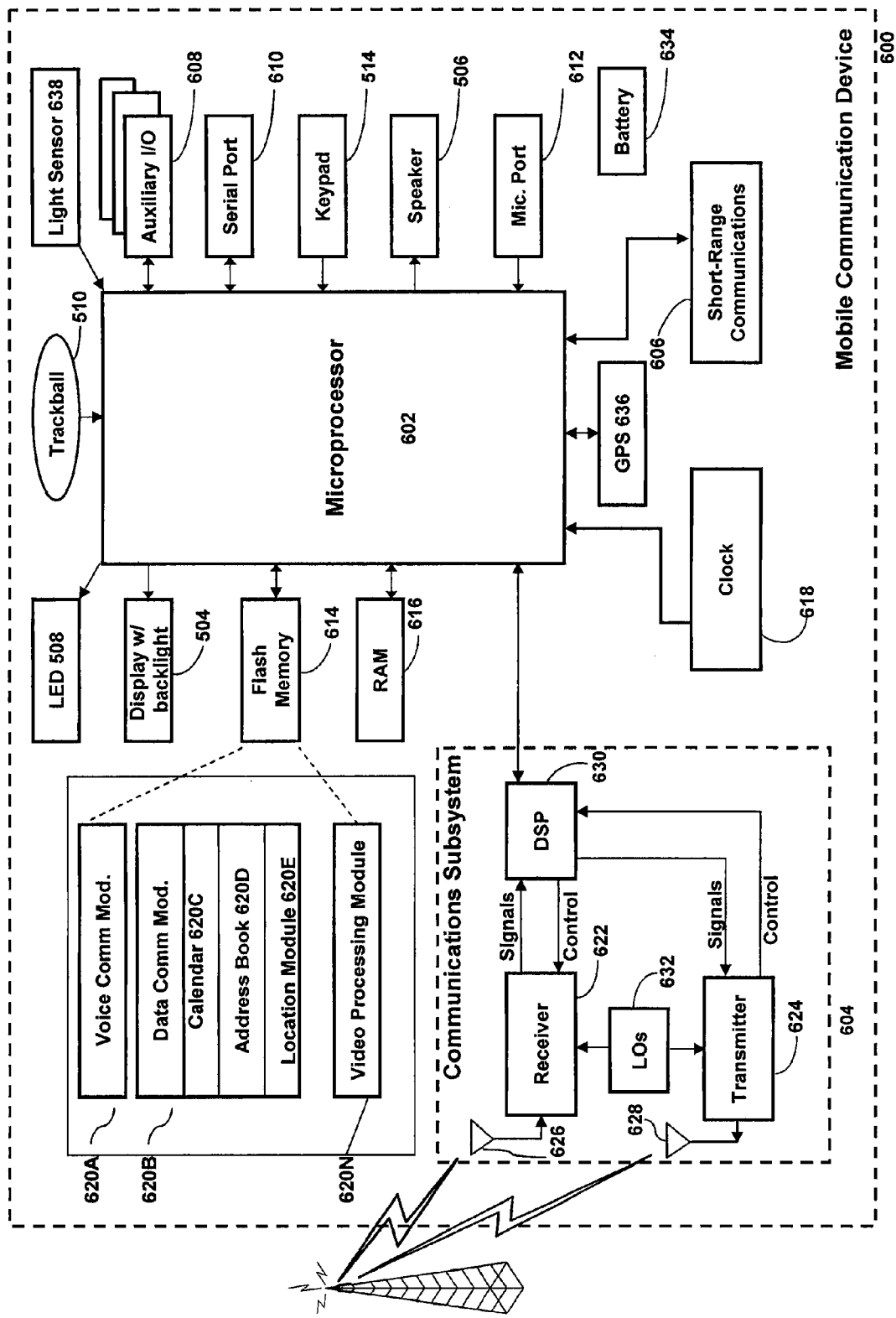
FIG. 6 is a block diagram of certain internal components of the device in FIG. 5.

Referring to FIG. 6, functional components of device 108 are provided in schematic 600. The functional components are generally electronic, structural or electro-mechanical devices. In particular, microprocessor 602 is provided to control and receive almost all data, transmissions, inputs and outputs related to device 108. Microprocessor 602 is shown schematically as coupled to keypad 514 and other internal devices. Microprocessor 602 preferably controls the overall operation of the device 108 and its components. Exemplary microprocessors for microprocessor 602 include Data 950 (trade-mark) series microprocessors and the 6200 series microprocessors, all available from Intel Corporation. Microprocessor 602 is connected to other elements in device 108 through a series of electrical connections to its various input and output pins. Microprocessor 602 has an IRQ input line which allows it to receive signals from various devices. Appropriate interrupt firmware is provided which receives and reacts to the signals detected on the IRQ line.

In addition to the microprocessor 602, other internal devices of the device 108 are shown schematically in FIG. 6. These include: display 504; speaker 506; keypad 514; communication sub-system 604; short-range communication sub-system 606; auxiliary I/O devices 608; serial port 610; microphone port 612 for microphone 518; flash memory 614 (which provides persistent storage of data); random access memory (RAM) 616; clock 618 and other device sub-systems (not shown). Device 108 is preferably a two-way radio frequency (RF) communication device having voice and data communication capabilities. In addition, device 108 preferably has the capability to communicate with other computer systems via the Internet.

Operating system software executed by the microprocessor 602 is preferably stored in a computer-readable medium, such as flash memory 614, but may be stored in other types of memory devices, such as read-only memory (ROM) or similar storage element. In addition, system software, specific device applications, or parts thereof, may be temporarily loaded into a volatile store, such as RAM 616. Communication signals received by the mobile device may also be stored to RAM 616.

In addition to an operating system operating on device 108, additional software modules 620 enable execution of software applications on device 108. A set of software (or firmware) applications, generally identified as applications 620, that control basic device operations, such as voice communication module 620 and data communication module 620B, may be installed on the device 108 during manufacture or downloaded thereafter. As well, software modules, such as calendar module 620C, address book 620D and location module 620E. Video processing module 620N is software or firmware that provides processes to receive individual packets for a video frame, collect the packets to recreate the frame and generate them on display 504. The packets can be received from outside sources (including from transmissions received from subsystem 604). As such, video processing module provides the functionality of buffer and algorithm 216 and decoder 218 shown in FIG. 2. Different versions of the software for video processing module 620N may be tracked by an embodiment, as shown in Table A. Different versions may be able to more efficiently handle video images, thereby allowing higher resolutions and colour depths to be used for a given transmission rate. Additional modules such as personal information manager (PIM) application may be provided. Any module may be installed during manufacture or downloaded thereafter into device 108. Data associated with each application can be stored in flash memory 614.

Communication functions, including data and voice communications, are performed through the communication sub-system 604 and the short-range communication sub-system 606. Collectively, sub-systems 604 and 606 provide the signal-level interface for all communication technologies processed by device 108. Various applications 620 provide the operational controls to further process and log the communications. Communication sub-system 604 includes receiver 622, transmitter 624 and one or more antennas, illustrated as receive antenna 626 and transmit antenna 628. In addition, communication sub-system 604 also includes processing modules, such as digital signal processor (DSP) 630 and local oscillators (LOs) 632. The specific design and implementation of communication sub-system 604 is dependent upon the communication network in which device 108 is intended to operate. For example, communication sub-system 604 of device 108 may operate with the Mobitex (trade-mark), DataTAC (trade-mark) or General Packet Radio Service (GPRS) mobile data communication networks and also operate with any of a variety of voice communication networks, such as Advanced Mobile Phone Service (AMPS), Time Division Multiple Access (TDMA), Code Division Multiple Access (CDMA), CDMA 2000, Personal Communication Service (PCS), Global System for Mobile Communication (GSM), etc. Other types of data and voice (telephonic) networks, both separate and integrated, may also be utilized with device 108. In any event, communication sub-system 604 provides device 108 with the capability of communicating with other devices using various communication technologies, including instant messaging (IM) systems, text messaging (TM) systems and short message service (SMS) systems.

Short-range communication sub-system 606 enables communication between device 108 and other proximate systems or devices, which need not necessarily be similar devices. For example, the short-range communication sub-system may include an infrared device and associated circuits and components, or a Bluetooth (trade-mark) communication module to provide for communication with similarly enabled systems and devices.

In addition to processing communication signals, DSP 630 provides control of receiver 626 and transmitter 624. For example, gains applied to communication signals in receiver 622 and transmitter 624 may be adaptively controlled through automatic gain-control algorithms implemented in DSP 630.

Powering the entire electronics of the mobile handheld communication device is power source 634. In one embodiment, the power source 634 includes one or more batteries. In another embodiment, the power source 634 is a single battery pack, especially a rechargeable battery pack. A power switch (not shown) provides an "on/off" switch for device 108. A power source interface (not shown) may be provided in hardware, firmware, software or a combination of such elements to selectively control access of components in device 108 to power source 634. Upon activation of the power switch an application 620 is initiated to turn on device 108. Upon deactivation of the power switch, an application 620 is initiated to turn off device 108. Power to device 108 may also be controlled by other devices and by software applications 620.

Device 108 may also have global positioning system 636 to assist in identifying a present location of device 108 and may also have light sensor 638 to provide data on the ambient light conditions for device 108.

While an embodiment has been described as relating to control of transmission rates of a video transmission to a wireless device, it will be appreciated that other embodiments may be provided where transmission rates of any data transmission is controlled for any device capable of receiving the data transmission.

The present invention is defined by the claims appended hereto, with the foregoing description being merely illustrative of embodiments of the invention. Those of ordinary skill may envisage certain modifications to the foregoing embodiments which, although not explicitly discussed herein, do not depart from the scope of the invention, as defined by the appended claims.

We claim:

1. A method for transmitting a video stream destined for a display of a remote device through a communication network, comprising at a server in the network:
   monitoring for initiation of transmission of the video stream to the remote device;
   at the server accessing parameters for resolution and depth characteristics of the display and video processing software provided on the remote device for processing the video stream on the display of the remote device;
   for the remote device, identifying a transmission rate progression established for the communication network for the remote device based on an analysis of the resolution and depth characteristics and an installed version of the video processing software, the progression including parameters relating to a transmission rate, a resolution and a color depth for the transmission at first and second transmission times in the progression, the parameters including:
      for an initial transmission time, an initial transmission rate, an initial resolution and an initial color depth;
      for the first transmission time following the initial transmission time, a first transmission rate, a first resolution and a first color depth for the transmission, the first transmission rate being faster than the initial transmission rate; and
      for the second transmission time following the first transmission time, a second transmission rate, a second resolution and a second color depth for the transmission, the second transmission rate being faster than the first transmission rate and the second color depth being deeper than the first color depth;
   using parameters of the transmission rate progression to govern transmission parameters of the video stream to the remote device;
   initiating the transmission at the initial transmission rate at the initial resolution and the initial color depth set by the transmission rate progression;
   at the first transmission time, automatically increasing the transmission rate to the first transmission rate and increasing at least the initial color depth to the first color depth set by the transmission rate progression; and
   at the second transmission time, automatically increasing the transmission rate to the second transmission rate and setting the color depth to the second color depth set by the transmission rate progression,
   wherein
      the data transmission is configured to avoid dropping frames from the video stream.

2. The method for transmitting a video stream as claimed in claim 1, wherein:
   monitoring for an acknowledgement signal from the remote device during transmission of the video stream between the first and the second transmission time is not conducted.

3. The method for transmitting a video stream as claimed in claim 2, wherein:
   the remote device is a wireless device; and
   the transmission rate is adjusted according to a UMTS protocol.

4. The method for transmitting a video stream as claimed in claim 3, wherein the method is executed at a transcoder providing the video stream to the wireless device.

5. The method for transmitting a video stream as claimed in claim 4, wherein a scheduler in the transcoder controls releases of frames of the video stream to the wireless device at parameters set by the transmission rate progression.

6. The method for transmitting a video stream as claimed in claim 1, wherein the transmission rate is further adjusted depending on a receipt history of acknowledgement messages received by the transcoder from the remote device.

7. The method for transmitting a video stream as claimed in claim 1, wherein:
   the remote device provides to the transcoder data relating to resolution and color depth capabilities of the display and data relating to the video processing software.

8. The method for transmitting a video stream as claimed in claim 1, wherein:
   capabilities of a central processor unit of the remote device, the display and the version of the video processing software are analyzed to determine whether to transmit the video stream at the initial resolution or the initial color depth at the initial transmission time.

9. The method for transmitting a video stream as claimed in claim 1, wherein:
   capabilities of a central processor unit of the remote device, the display and the version of video processing software are analyzed to determine whether to increase the initial resolution to the first resolution or the initial color depth to the first color depth at the first transmission time.

10. The method for transmitting a video stream as claimed in claim 9, wherein:

the parameters are analyzed determine whether to set the resolution to the second resolution or the color depth to the second color depth at the second transmission time.

11. The method for transmitting a video stream as claimed in claim 1, wherein frame compression is used to compress data for the transmission.

12. The method for transmitting a video stream as claimed in claim 1, further comprising:
at the second transmission time, setting the resolution to the second resolution.

13. A module for transmitting a video stream for a portable device through a communication network, comprising:
a microprocessor;
a monitoring process providing instructions to the microprocessor to monitor for initiation of transmission of the video stream to the portable device;
device data related to resolution and depth characteristics of a display of the device and a version of video processing software provided on the device;
transmission parameter data identifying a transmission rate progression having parameters relating to a transmission rate, a resolution and a color depth for the transmission of a display on the device based on the device data, the transmission rate progression including:
for an initial transmission time, an initial transmission rate, an initial resolution and an initial color depth;
for a first transmission time following the initial transmission time, a first transmission rate, a first resolution and a first color depth for the transmission, the first transmission rate being faster than the initial transmission rate; and
for a second transmission time following the first transmission time, a second transmission rate, a second resolution and a second color depth for the transmission, the second transmission rate being faster than the first transmission rate; and
a transmission adjustment process providing instructions to the microprocessor
to initiate the transmission at the initial transmission rate at the initial resolution and the initial color depth based on the transmission rate progression;
to increase the transmission following a transmission rate progression established for the communication network based on the transmission rate progression; and
to increase the color depth of the video stream for the device when the transmission is increased based on the transmission rate progression,
wherein
the module does not monitor for an acknowledgement signal from the device during transmission of the video stream between the first and the second transmission time.

14. The module for transmitting a video stream for a portable device as claimed in claim 13, wherein:
the portable device is a wireless device; and
the transmission rate is adjusted according to a UMTS protocol.

15. The module for transmitting a video stream for a portable device as claimed in claim 14, wherein the module is a transcoder providing the video stream to the wireless device.

16. The module for transmitting a video stream for a portable device as claimed in claim 15, wherein a scheduler in the transcoder controls releases of frames of the video stream to the wireless device at parameters set by the transmission rate progression.

17. The module for transmitting a video stream for a portable device as claimed in claim 13, transmission adjustment module is configured to avoid dropping frame from the video stream in the data transmission.

18. The module for transmitting a video stream for a portable device as claimed in claim 13, wherein the transmission adjustment process further provides instructions to the microprocessor:
to analyze capabilities of a central processor unit of the portable device, the display and the version of the video processing software to determine whether to transmit the video stream at the initial resolution or the initial color depth at the initial transmission time.

19. The module for transmitting a video stream for a portable device as claimed in claim 13, wherein the transmission adjustment process further provides instructions to the microprocessor:
to analyze capabilities of a central processor unit of the portable device, the display and the version of the video processing software to determine whether to set the resolution to the first resolution or the color depth to the first color depth at the first transmission time.

20. The module for transmitting a video stream for a portable device as claimed in claim 19, wherein the transmission adjustment process further provides instructions to the microprocessor:
to analyze the capabilities to determine whether to set the resolution to the second resolution or the color depth to the second color depth at the second transmission time.

* * * * *